GLASS MOLDED TYPE SEMICONDUCTOR DEVICE

Filed Nov. 24, 1964

INVENTORS
SHIGERU TSUJI
SHINZO ANAZAWA
TSUKASA KOYAMA
Hopgood & Calimafde
ATTORNEYS United States Patent Office 3,377,522

Patented Apr. 9, 1968

3,377,522

GLASS MOLDED TYPE SEMICONDUCTOR DEVICE

Shigeru Tsuji, Shinzo Anazawa, and Tsukasa Koyama, Tokyo, Japan, assignors to Nippon Electric Company, Limited, Tokyo, Japan, a corporation of Japan Filed Nov. 24, 1964, Ser. No. 413,446
Claims priority, application Japan, Dec. 23, 1963, 38/69,379
4 Claims. (Cl. 317—234)

Figure 1A:
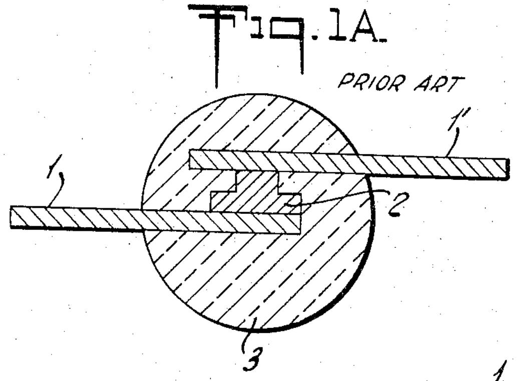
FIG. 1A. PRIOR ART

This invention relates to an improved glass molded semiconductor device and more particularly to such a device in which the glass mold contains bubbles.

In the specification, the term "sintering condition" refers to a fine powdered glass that is brought to a semi-melted condition whereby the particles of glass powder stick to one another, causing the formation of air within the melt. The term "vesicant" is defined as a substance which acts as a gas generating agent through a reaction such as oxidation, thermal decomposition, or sublimation.

Miniature semiconductor devices having high reliability have been produced at low cost, the semi-conductor element portion of the device being directly molded in low melting point glass, or glass having a low melting point which devitrifies upon thermal treatment to become ceramic, i.e., a low melting point devitroceramic. Examples of such devices are a diode consisting of a semiconductor element with lead wires hermetically molded in low melting point glass, and a transistor consisting of a semiconductor element, lead wires and a ceramic pellet assembled together and hermetically molded in low melting point glass.

In these semiconductor device structures, however, strain is caused within the semiconductor element, the low melting point glass or the low melting point devitroceramic, when the thermal expansion coefficients of the materials comprising the device are not matched. This results in undesirable effects on the semiconductor element characteristics or in low resistance to thermal shocks. It is difficult with the above device structures to obtain a semiconductor device satisfying the rigid requirements necessary for various applications.

The present invention provides semiconductor devices which are hermetically sealed without deleteriously affecting the device characteristics, and which are stable against thermal shocks by minimizing the permanent strain which ordinarily results from unmatched sealing.

Minimizing the permanent strain resulting from unmatched sealing may be accomplished by minimizing the absolute value of the strain or dispersing the strain. The former may be achieved by lowering the setting point of the low melting point glass or the low melting point devitroceramic. The latter may be achieved by forming bubbles within the low melting point glass or the low melting point devitroceramic, that is, by lowering the strain point as much as possible while simultaneously forming minute bubbles uniformly within the glass portion or the devitroceramic portion while the element is being sealed.

As is well known, fine glass powder is brought to a sintered condition in order to form bubbles within the glass, however, this alone is usually insufficient for desired purposes and in many cases a vesicant is therefore employed. Examples of suitable vesicants are $CaCO_3$, which generates gas by thermal decomposition, carbon which generates gas by oxidation, and $TeO^2$ which gasifies by sublimation. In accordance with a known manufacturing method, a glass, having a composition of $$71.55SiO_2+2.16(Al_2O_3+Fe_2O_3)+9.50CaO+2.48MgO+14.31(Na_2O+K_2O)$$

for example, is mixed with an arbitrary amount, 1% for example, of fine powdered vesicant, such as carbon for example, and the mixture is preheated, at 400° C. for example, and then heated rapidly to approximately 700° C. The heated mixture is then sintered, at 850° C. for example, and slowly cooled down to 600° C. for example. This method however, is applicable only to a glass having a slow graded temperature-viscosity curve, i.e., a high melting point glass, and is not applicable to glass with a steep gradient temperature-viscosity curve, such as low melting point glass. In the case of an ordinary glass, bubbles may be formed in the glass at a temperature in the range of 300°–400° C., but in the case of a low melting point glass, the temperature range is extremely narrow. Thus, when $Pb_3O_4$ is used as a vesicant with a glass known commercially as Corning #7570 glass, such temperature range is 30°–50° C. A high level of glass working proficiency is required in order to satisfactorily work in this narrow temperature range, involving an undesirable economic factor, and in addition, it is difficult to form homogeneous bubbles uniformly, which is necessary to obtain perfect air-tightness. Accordingly, a strong vesicant is unsuitable for forming such bubbles within a low melting point glass.

Accordingly, it is an object of this invention to provide an improved method for forming an air tight seal utilizing a bubble type glass, which is both extremely simple and economical.

It is another object of the present invention to provide glass molded semiconductor devices in which the permanent strain in the glass due to unmatched sealing is reduced by means of economical and simple processes.

A still further object of the invention is to provide glass molded semiconductor devices in which the device characteristics are unaffected by unmatched sealing.

Figure 1B:
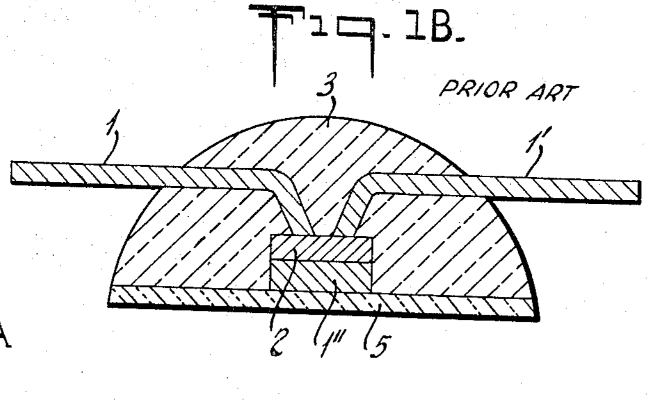
FIG. 1B. PRIOR ART
Figure 2A:
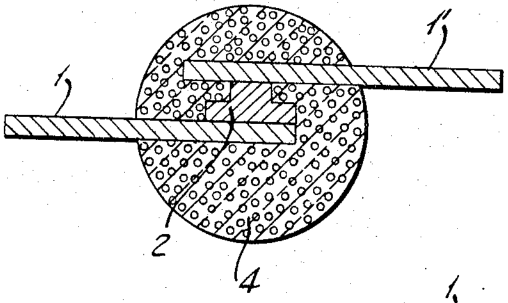
Figure 2B:
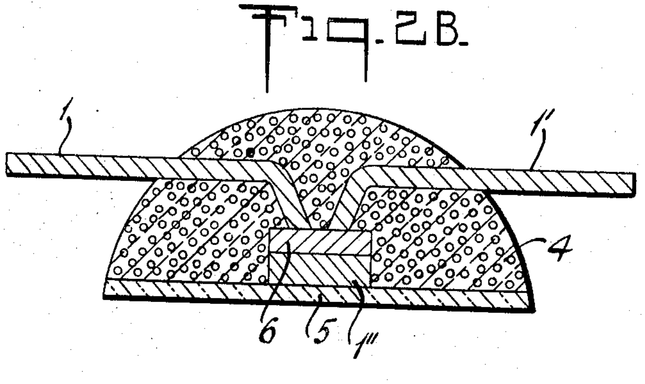

All of the objects, features and advantages of this invention and the manner of attaining them will become more apparent and the invention itself will be best understood by references to the following description of an embodiment of the invention taken in conjunction with the accompanying drawing, in which:

FIGS. 1A and 1B show cross sectional views of a conventional glass molded type diode and transistor, respectively, and FIGS. 2A and 2B are cross sectional views of a glass molded type diode and transistor, respectively, made in accordance with the present invention.

In accordance with an aspect of this invention a fine powdered solid substance which is nonreactive with low melting point glass and relatively porous is uniformly mixed with a fine powdered low melting point glass. The fine powdered solid substance is preferably, but not necessarily a fine ceramic material. The low melting point glass powder may be mixed with an arbitrary amount of the solid substance powder. Upon heating of the mixture, the air contained in the powdered porous substance expands and forms bubbles having the powder as nuclei. Near the sealing temperature the bubbles, being mobile, form uniform bubbles, as they gather around the various fine powder particles.

Referring now to the conventional structure of FIG. 1A, a diode consisting of a semiconductor element 2 and lead wires 1 and 1' is directly molded in a low melting point glass 3 so as to be sealed hermetically therein. In the conventional structure of FIG. 1B an assembled transistor consisting of a semiconductor element 2, lead wires 1, 1' and 1'' and a ceramic pellet 5 is directly molded in a low melting point glass 3, and is sealed hermetically therein.

In FIG. 2A there is shown a diode assembly comprising lead wires 1 and 1', such as silver lead tapes of 0.1 mm. thickness and 1 mm. width for example, and a semiconductor element 2, which may be for example a mesa type silicon diode element 0.6 mm. square. This assembly is molded in bubble glass 4 in accordance with the present invention. In accordance with a preferred embodiment, a low melting point glass with a composition of $57.6PbO+12.2B_2O_3+2Al_2O_3+28.2Tl_2O$, having a thermal expansion coefficient of $126\times10^{-7}/°$ C. and a sealing point of 360° C. is powdered preferably to a fineness of at least 300 mesh screen and mixed well with 5.7% by weight of a solid substance such as a $Li_2O+Al_2O_3+SiO_2$ system ceramic, such as for example, eucriptite ($Li_2O+Al_2O_3+2SiO_2$ thermal expansion coefficient of $-90\times10^{-7}/°$ C.) powdered preferably also to a fineness of at least 300 mesh screen. The 5.7% figure is only one preferred example and various other percentages may be employed for the solid substance, the preferred range is generally between 5%–45% and it is best to mix less than 45% in volume of the solid substance with the low melting point glass. A mixture in which the solid substance exceeds 45% of the volume causes the product to lose its vitreous nature, which is an important property to facilitate encapsulation of the semiconductor element. The mixture is then desirably sintered at approximately 310° C. and then molded at about 360° C., whereby uniform bubbles are formed around the sealing glass portion to produce a seal having extremely low strain compared with prior constructions. Tests of this improved construction show that the semiconductor element characteristics are not affected by repeated thermal shocks. Specifically, shocks of 50 water temperature cycles between 0° C. and 100° C. did not cause cracking in the sealing glass portion so that perfect air-tightness was maintained.

The range of coefficients for the powdered low melting point glass and the powdered solid substance ingredients depends only on the product itself, i.e., on the molded bubble glass structure produced. In other words, all ranges of coefficients for such product that is formed with less than 45% solid substance can be satisfactorily employed according to the invention. For the above example, the utilizable coefficient of expansion of the finished product ranges generally from $28.8\times10^{-7}$ to $115.2\times10^{-7}$.

In FIG. 2B there is shown a transistor assembly comprising lead wires 1, 1' and 1", such as copper lead tapes of 0.1 mm. thickness and 0.6–1 mm. width for example, and a semiconductor element 6, which may be, for example, a planar type silicon transistor element 0.7 mm. square. A ceramic pellet 5, which may be a forsterite ($Mg_2SiO_4$) pellet for example, is molded to low melting point bubble glass in accordance with the present invention. One suitable low melting point glass may have a composition of $71PbO+5B_2O_3+15Bi_2O_3+9Tl_2O$, a thermal expansion coefficient of $134.4\times10^{-7}$ and a sealing point of 350° C. This glass is powdered preferably to a fineness of at least 300 mesh screen and mixed with 7.2% by weight of solid substance powdered preferably to a fineness of at least 300 mesh screen. This solid substance may be a Corning #9010 type glass or alumina for example. The Corning #9010 glass has a thermal coefficient of expansion of $89\times10^{-7}/°C.$; alumina ($Al_2O_3$) has a coefficient of $63\times10^{-7}/°C$. As in the example described above, the solid substance preferably comprises 45% or less of the total volume of the mixture.

The mixture, or the mixture sintered at 300° C. and powdered finer than 300 mesh screen, is molded having the transistor element therein. The resulting molded transistor is stable against thermal shocks and a hermetic seal is produced without affecting the characteristic of the semiconductor element.

It is to be noted that it is a feature of our invention that the thermal coefficient of expansion of the encapsulating housing can be selected without regard to the coefficients of the semiconductor element or the electrical leads by using the specific bubble glass for the encapsulating means. In one example of our experiments, a silicon diode having a size 0.6 mm. x 0.6 mm. in area and 0.2 mm. in thickness and a thermal coefficient of expansion approximately $30\times10^{-7}/°C.$ with two silver leads each 0.6 mm. in width and 0.08 mm. in thickness and having a coefficient approximately $200\times10^{-7}/°C.$, was encapsulated in a bubble glass having a coefficient approximately $90\times10^{-7}/°C$. The semiconductor device fabricated in this way showed virtually no change in its characteristics even after it was heated at 65° C. in an atmosphere of 100% humidity for 1,000 hours.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An improved semiconductor device comprising:
a semiconductor element having connecting leads, said element and portions of said leads being encapsulated in glass,
said glass having been formed from a composition including a low melting point glass and a porous solid substance that is substantially non-reactive with said low melting point glass,
and said glass being characterized by having substantially uniformly dispersed air bubbles throughout the same whereby a glass seal having an extremely low value of strain is produced around said semiconductor element.

2. The invention described in claim 1 wherein said low melting point glass and said porous solid substance have thermal coefficients of expansion which are substantially different from one another.

3. The invention described in claim 1 wherein said porous solid substance comprises a ceramic material.

4. The invention described in claim 3 wherein said material comprises a $Li_2O—Al_2O_3—SiO_2$ system ceramic.

References Cited

UNITED STATES PATENTS

| | | | |
|---|---|---|---|
| 2,412,836 | 12/1946 | Rose | 174—50.8 |
| 3,046,328 | 7/1962 | Schurecht | 174—152 |
| 3,144,318 | 8/1964 | Bruen et al. | 317—234 |
| 3,189,677 | 6/1965 | Anthony et al. | 174—50.61 |
| 3,238,424 | 3/1966 | Jenkinson | 317—234 |

JOHN W. HUCKERT, *Primary Examiner.*

J. D. CRAIG, *Assistant Examiner.*